United States Patent
Morliere et al.

(10) Patent No.: US 8,664,811 B2
(45) Date of Patent: Mar. 4, 2014

(54) DEVICE HAVING A BRUSH-HOLDER PLATE FOR SUPPLYING ELECTRICAL CURRENT TO AN ELECTRIC FAN SET OF A MOTOR VEHICLE AND A SUPPORT FOR AN ELECTRONIC CIRCUIT FOR SUPPLYING SAID MOTOR AND A MEANS FOR JOINING THE SUPPORT TO THE BRUSH-HOLDER PLATE

(75) Inventors: Benjamin Morliere, Osny (FR); Eddy Cheri-Zecote, Genicourt (FR); Daniel Marteau, Fremecourt (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 106 days.

(21) Appl. No.: 13/096,722

(22) Filed: Apr. 28, 2011
(Under 37 CFR 1.47)

(65) Prior Publication Data
US 2012/0319541 A1 Dec. 20, 2012

(30) Foreign Application Priority Data

Apr. 30, 2010 (FR) ...................................... 10 53374

(51) Int. Cl.
*H02K 11/00* (2006.01)
*H02K 13/00* (2006.01)
*H01R 39/38* (2006.01)

(52) U.S. Cl.
USPC ............. 310/68 D; 310/71; 310/238; 310/239

(58) Field of Classification Search
USPC ........................... 310/68 D, 71, 239, 248–249
See application file for complete search history.

(56) References Cited

U.S. PATENT DOCUMENTS

| 5,150,694 | A | 9/1992 | Currie et al. |
| 6,651,432 | B1 | 11/2003 | Gray, Jr. |
| 2007/0262836 | A1 * | 11/2007 | Voss ............................... 333/247 |
| 2009/0146510 | A1 * | 6/2009 | Uchimura ....................... 310/42 |

FOREIGN PATENT DOCUMENTS

| DE | 10 2007 041227 A1 | 4/2008 |
| DE | 10 2008 032250 A1 | 1/2010 |
| FR | 2827345 A1 * | 1/2003 |
| WO | 2005/005813 A2 | 1/2005 |
| WO | 2005/033251 A2 | 4/2005 |

OTHER PUBLICATIONS

Machine Translation FR2827345 (2003).*
French Search Report issued in the corresponding French application No. 1052431, mailing date Jan. 21, 2011 (3 pages).
Janach W et al.: "P-Booster and AGR/Lambda-Kombisteuerung Fuer Aufgeladenr Ottomotoren", MTZ Motortechnische Zeitschrift, Vieweg Verlag, DE, vol. 63, No. 6 Jun. 1, 2002 (pp. 502-508).

* cited by examiner

*Primary Examiner* — Tran Nguyen
*Assistant Examiner* — Jose Gonzalez Quinones
(74) *Attorney, Agent, or Firm* — Osha Liang LLP

(57) ABSTRACT

The invention relates to a device for supplying electrical current to an electric fan set of a motor vehicle, said device comprising a brush-holder plate (5), for supplying current to the motor of the set, a support (1) for an electronic circuit (3) for supplying said motor, said plate (5) and said support (1) being attached to one another.
According to the invention, said device also comprises means (13, 15, 17) for joining the support (1) to the brush-holder plate (5), arranged to ensure a prepositioning relative to one another at the time of assembly.

5 Claims, 2 Drawing Sheets

DEVICE HAVING A BRUSH-HOLDER PLATE FOR SUPPLYING ELECTRICAL CURRENT TO AN ELECTRIC FAN SET OF A MOTOR VEHICLE AND A SUPPORT FOR AN ELECTRONIC CIRCUIT FOR SUPPLYING SAID MOTOR AND A MEANS FOR JOINING THE SUPPORT TO THE BRUSH-HOLDER PLATE

The invention relates to a device for supplying electrical current to an electric fan set of a motor vehicle and an electric fan set of a motor vehicle equipped with such a device.

Currently, the electric fan sets of motor vehicles comprise a brush-holder plate, for supplying current to the motor of the set, and a support for an electronic circuit for supplying said motor, said plate and said support being attached to one another.

To avoid having to handle two parts, plate and support, it has already been proposed to use a printed circuit fixed to the yoke of the motor of the electric fan sets. The printed circuit is a printed circuit board or PCB, usually an IMS (insulated metallic substrate), and comprises control/command power and electronics electronic components, on a first region, and a brush-holder plate (BHP) on a second region.

This solution presents the drawback of requiring a complete new board to be developed for each new application whereas certain parts could be standardized. Furthermore, the IMSs are expensive and are located in a very hot region, which creates a thermal problem.

The object of the present invention is to overcome these drawbacks.

To this end, the invention relates to a device for supplying electrical current to an electric fan set of a motor vehicle, as described above and also comprising means for joining the support to the brush-holder plate, arranged to ensure a prepositioning relative to one another at the time of assembly.

Said electronic circuit of the support is, for example, a power and/or control/command circuit for supplying the motor of the electric fan set.

The support comprises, for example, a plate made of cast aluminium and said aluminium plate is electrically linked to the brush-holder plate, notably by lugs that help with the mechanical fixing of the plate and of the support.

Said brush-holder plate is intended, for example, to be attached to the yoke of the motor of the electric fan set.

Preferably, the joining means comprise gripping and holding means and positioning means.

Advantageously, the joining means comprise a gripping and holding finger and reference surfaces for positioning the brush-holder plate.

Also advantageously, the brush-holder plate and the joining means are arranged to fix said plate to said support by the combination of a translation of determined direction and of a rotation about an axis parallel to said direction.

The invention will be better understood in light of the description of the invention and the appended drawings in which.

Figure 1:
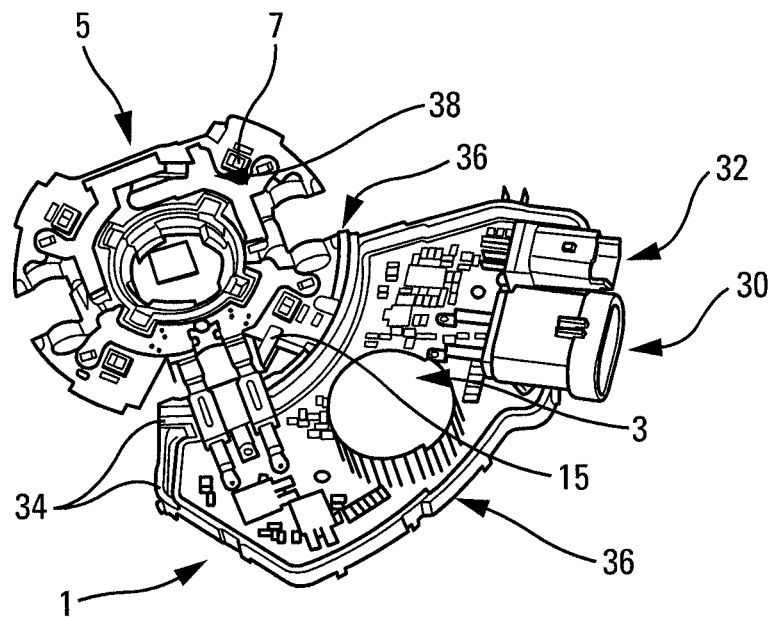
FIG. 1 shows in perspective an exemplary embodiment of a supply device according to the invention.

As illustrated in FIG. 1, the invention relates to a device for supplying electrical current to an electric fan set of a motor vehicle comprising a brush-holder plate 5, for supplying current to the motor of the set. Said plate is intended to be mounted on the yoke of the electric fan set motor, not shown. Said device also comprises a support 1 for an electronic circuit supplying said motor. Said plate 5 and said support 1 are attached to one another.

Said electronic circuit 3 of the support 1 is, for example, a power and/or control/command circuit for supplying the motor of the electric fan set. It may comprise power current connectors 30 and/or connectors 32 for control/command current to external circuits.

The support 1 comprises a plate made of cast aluminium to receive components of the power and/or control/command electronic circuits.

Said aluminium plate is surrounded by a band 34, partly situated facing an edge 36 of the brush-holder plate 5, said band 34 and said edge 36 being in the form of an arc of a circle so as to allow for a rotation of the brush-holder plate 5 relative to the support 1 at the time of assembly, as will be detailed below. The band 34 and the edge 36 also constitute a mutual bearing surface.

In this way, the brush-holder plate 5 is situated alongside the support 1, notably radially. The brush-holder plate 5 thus extends substantially in the same plane as that in which the support 1 extends.

Said joining means are provided in the vicinity of said band 34 and said edge 36. They are therefore peripheral parts of the brush-holder plate 5 and/or of the support 1. The joining means comprise metal elements present on the brush-holder plate 5 and plastic elements present on the support 1, or vice versa, cooperating with one another to ensure the pre-positioning.

Figure 2:
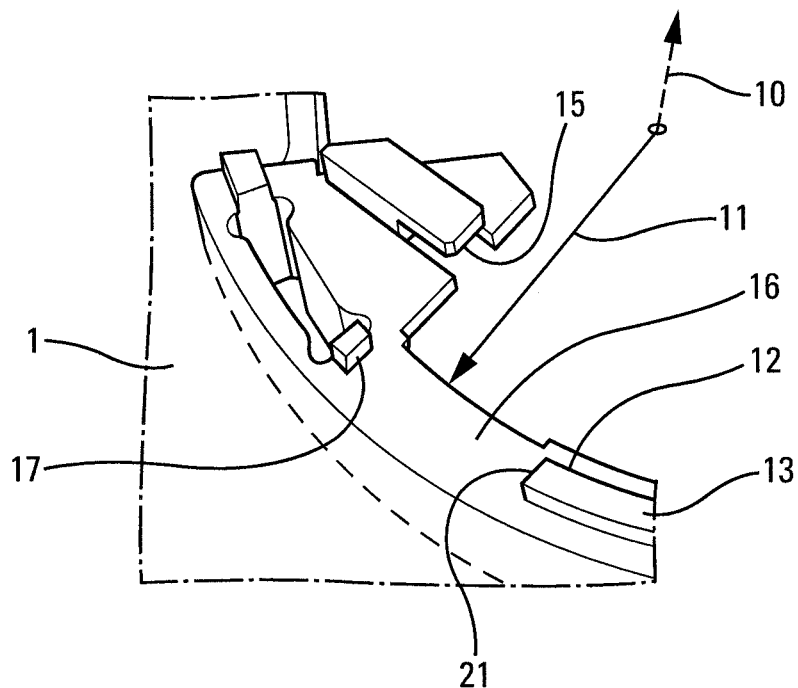
FIG. 2 shows a part of the joining means of the invention.

FIG. 2 shows only the support 1 for the power electronic circuit of the electric fan set described previously, seen from above.

The surface 12 of the support 1 intended to be in contact with the BHP plate 5 comprises a circular rail portion 13 of substantially vertical axis 10, of radius 11, having a first end 21 and a second end not shown.

It also comprises a finger 15 for joining the BHP plate 5 in opposition to the rail 13 and separated from it by a window 16 for engaging the BHP plate 5 on the support 1.

The surface 12 also comprises an end-of-rotation reference positioning abutment 17.

Figure 3A:
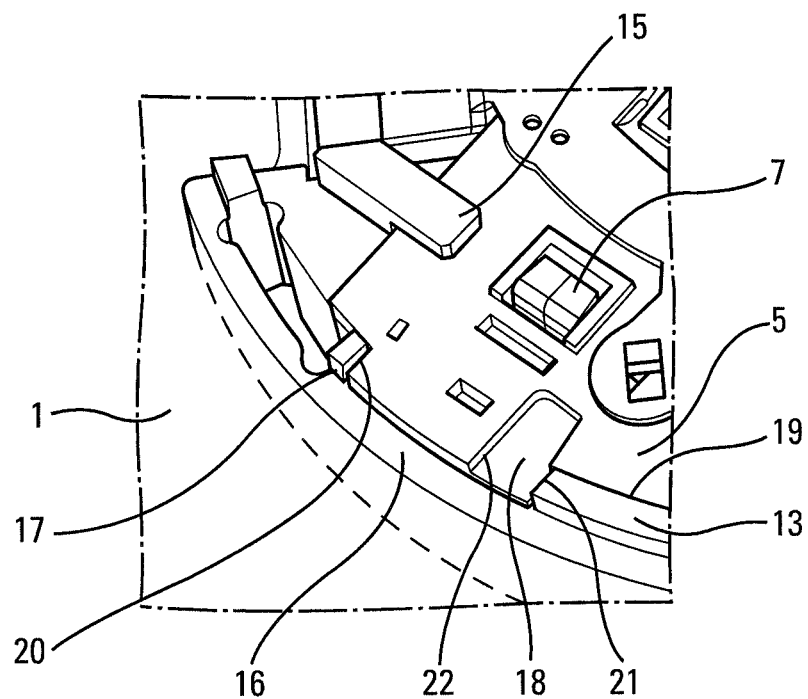
FIG. 3a shows the brush-holder plate joined to its support by the joining means of the invention seen from above.
Figure 3B:
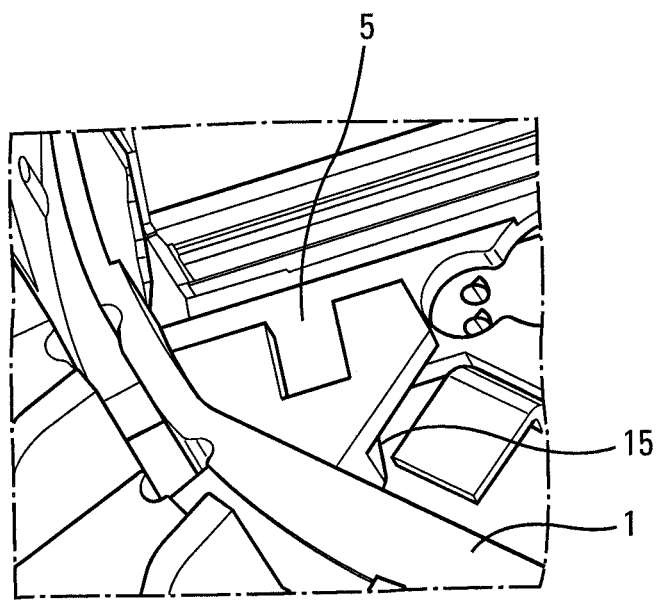
FIG. 3b shows the plate of FIG. 3a seen from above.

At the same time, with reference to FIG. 3-a showing the assembly of the plate 5 on the support 1 and corresponding to FIG. 2, the plate 5 comprises a cylindrical portion 19, of axis 10, of radius 11 and which can slide on the rail 13 when the plate 5 is made to pivot about the axis 10, an opening 18 to engage the plate 5 on the support 1 and place the cylindrical portion 19 in contact on the rail 13, which also serves as a positioning reference complementing the abutment 17 at least when the plate 5 is held and gripped in the finger 15, and a bearing face 20 on the abutment 17.

It will be noted that the window 18 is wide enough to enable the surface 19 to be placed in contact on the rail 13. In practical terms, it is at least as wide as the part of the finger 15 which grips the plate 5 is long.

The means 12, 13 and 15 are thus arranged to hold the BHP plate 5 on the support 1 in an axial position determined by the axis 10 and grip it between the surface 12 and the finger 15 and the means 17, 20 and 13, 19 allow for its accurate positioning.

Moreover, referring once again to FIG. 1, it can be seen that the plate 5 and the support 1 are electrically linked to one another by lugs 8 providing an electrical contact between the power part of the electronic circuit of the support 1 and the plate 5, in particular with tracks 38, intended to link said circuit to the brushes 7. These lugs 8 help with fixing the plate 5 and the support 1 together.

The assembly of the plate 5 will now be described.

To fix the plate 5 to the support 1, said plate is applied to the support 1, flat, by translation in the direction determined by the axis 10, until it comes to bear on the surface 12, and by ensuring that the edge 22 of the window 18 closest to the bearing face 20 is facing the end 21 of the rail portion 13.

Then, by a rotation about the axis 10, the face 20 is made to bear on the abutment 17, the plate 5 being engaged between the finger 15 and the surface 12.

With the plate thus being held in position, the supply tracks for the electric fan are soldered to the lugs 8, which completes the fixing of the BHP plate 5 to its support 1 without the need to use screws.

The invention claimed is:

1. A device for supplying electrical current to an electric fan set of a motor vehicle, said device comprising:
   a brush-holder plate for supplying current to the motor of the electric fan set;
   a support for an electronic circuit for supplying said motor, wherein said plate and said support are attached to one another, the brush-holder plate being situated alongside the support; and
   means for joining the support to the brush-holder plate, arranged to ensure a prepositioning relative to one another at the time of assembly, wherein the means for joining the support to the brush-holder plate comprises:
      a circular rail portion comprised in a surface of the support intended to be in contact with the brush-holder plate, said circular rail portion having a first end, and
      a gripping and holding finger comprised in the support, the finger being in opposition to the circular rail and separated from the circular rail by a window for engaging the brush-holder plate on the support.

2. The device according to claim 1, in which the support is made of cast aluminum.

3. The device according to claim 1, in which the brush-holder plate and the joining means are arranged to fix said plate to said support by the combination of a translation of determined direction and of a rotation about an axis parallel to said direction.

4. An electric fan set comprising:
   a device for supplying current comprising:
      a brush-holder plate for supplying current to the motor of the electric fan set;
      a support for an electronic circuit for supplying said motor, wherein said plate and said support are attached to one another, the brush-holder plate being situated alongside the support; and
   means for joining the support to the brush-holder plate, arranged to ensure a prepositioning relative to one another at the time of assembly, wherein the means for joining the support to the brush-holder plate comprises:
      a circular rail portion comprised in a surface of the support intended to be in contact with the brush-holder plate, said circular rail portion having a first end, and
      a gripping and holding finger comprised in the support, the finger being in opposition to the circular rail and separated from the circular rail by a window for engaging the brush-holder plate on the support.

5. The device according to claim 2, in which said means for joining the support to the brush-holder plate are arranged to hold the plate on the support in said determined direction, and grip the brush-holder plate between the surface of the support intended to be in contact with the plate and the finger.

* * * * *